UNITED STATES PATENT OFFICE.

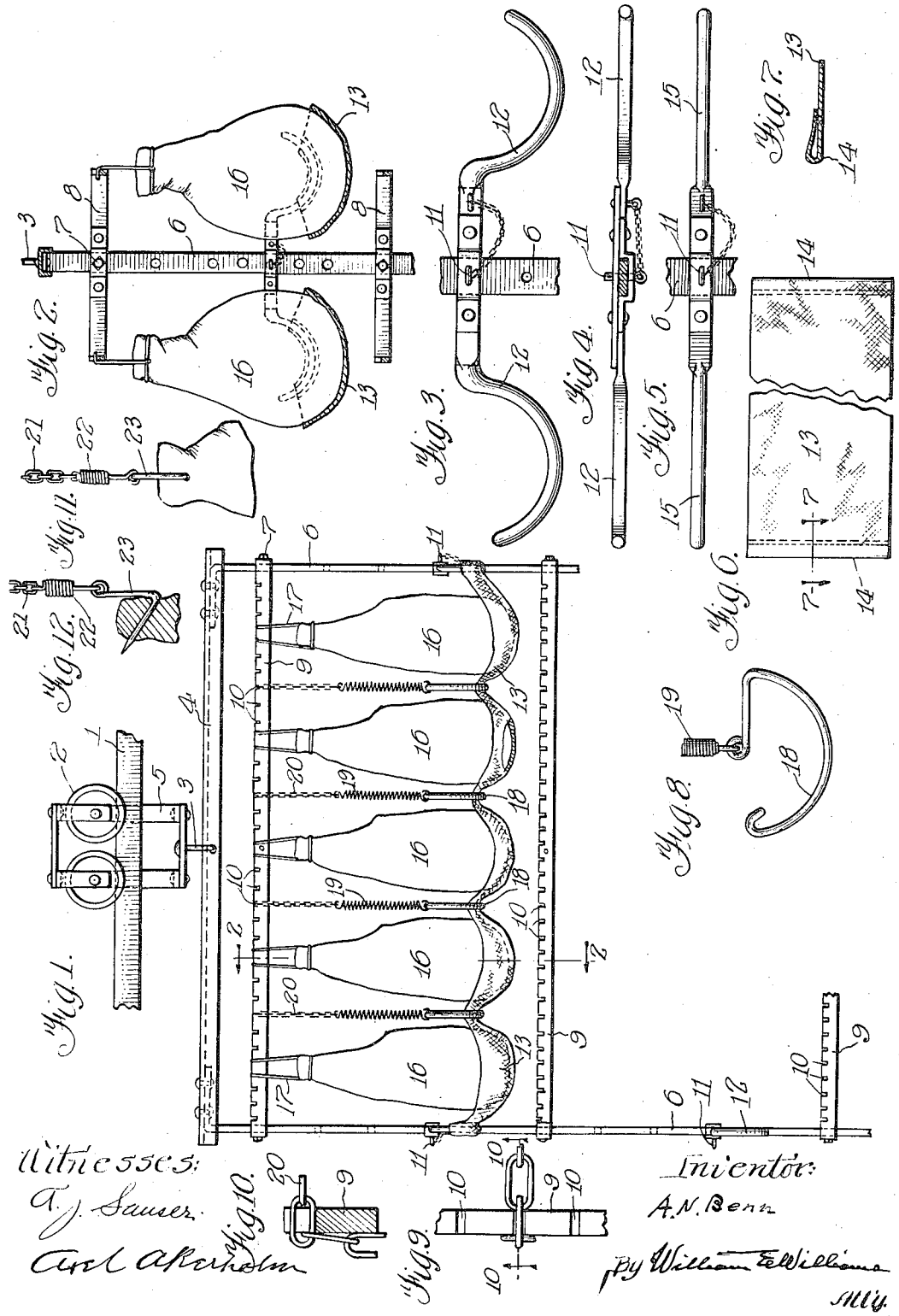
A. N. BENN.
PROCESS FOR TREATING AND CURING MEATS AND FOOD PRODUCTS.
APPLICATION FILED MAY 2, 1916.
1,209,803.
Patented Dec. 26, 1916.
4 SHEETS—SHEET 1.

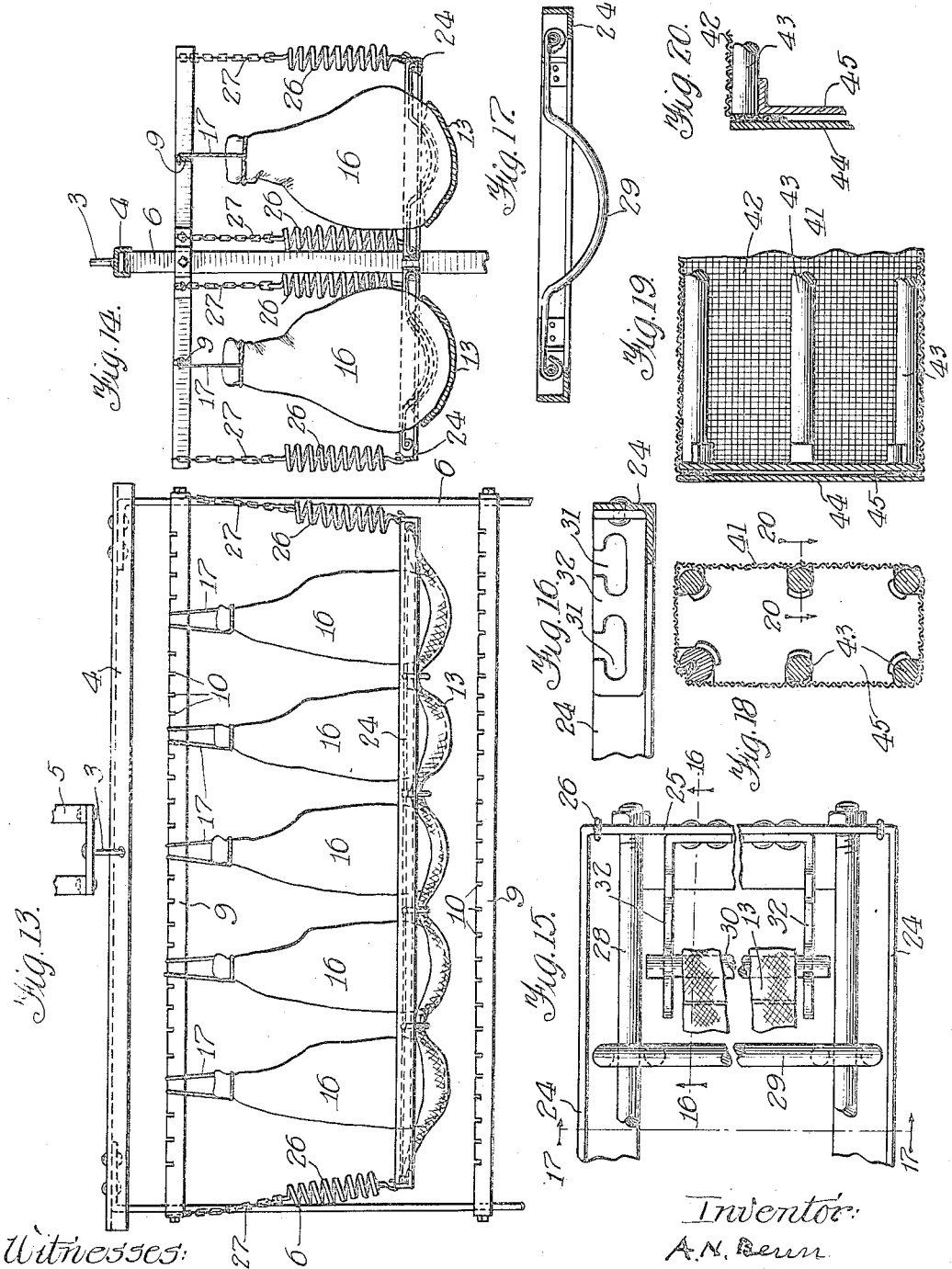

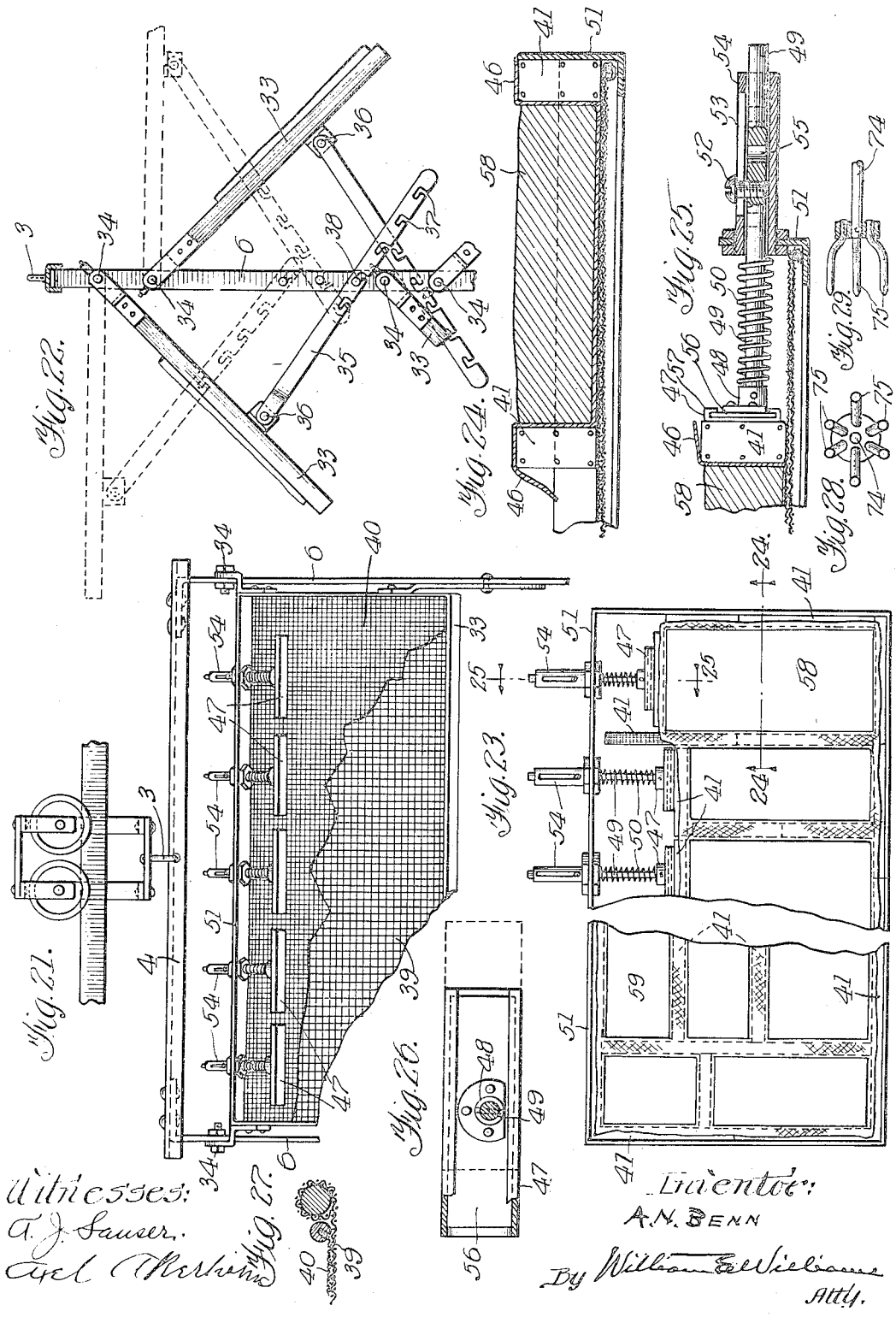

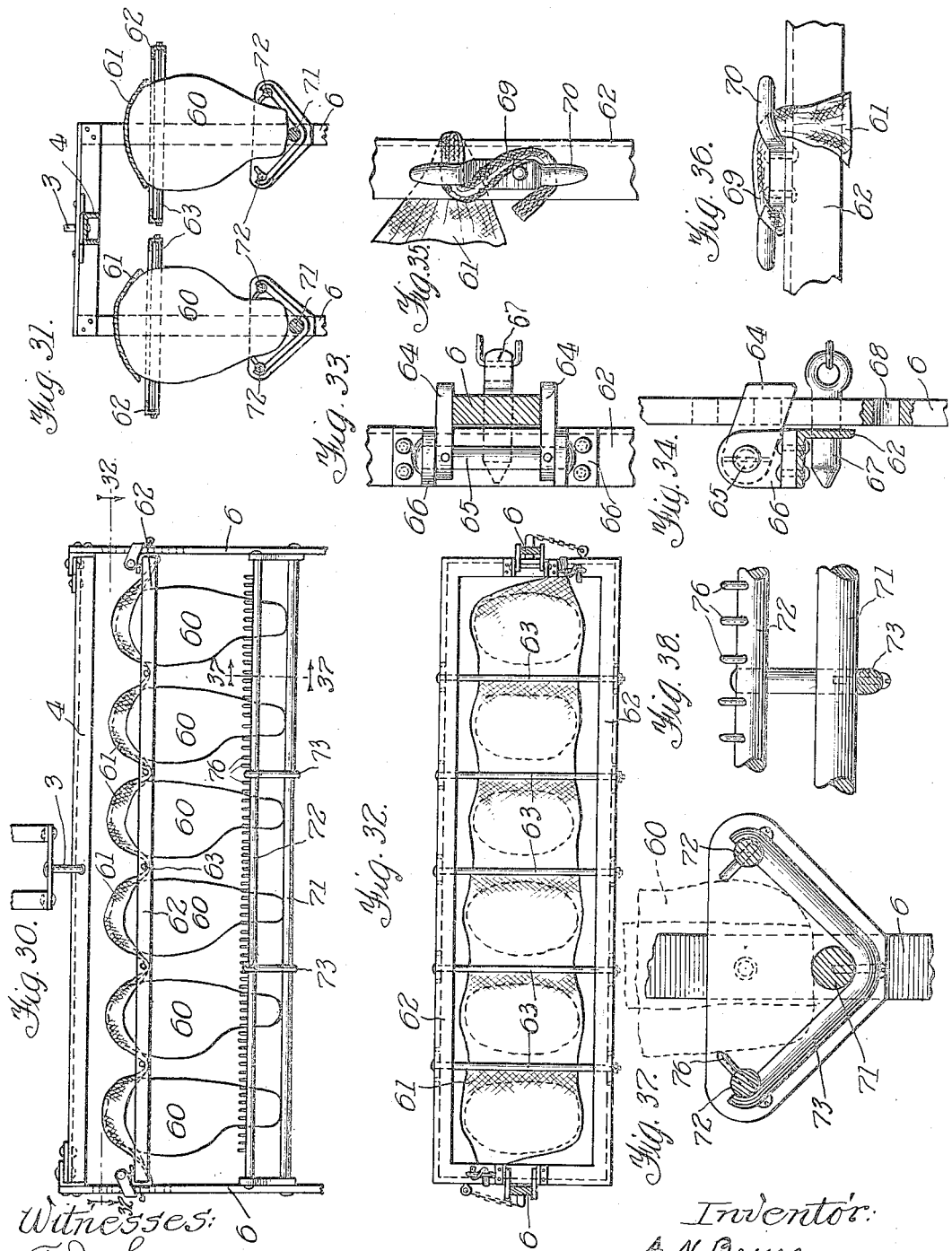

ALONZO NEWTON BENN, OF CHICAGO, ILLINOIS.

PROCESS FOR TREATING AND CURING MEATS AND FOOD PRODUCTS.

1,209,803.

Specification of Letters Patent. Patented Dec. 26, 1916.

Application filed May 2, 1916. Serial No. 94,991.

*To all whom it may concern:*

Be it known that I, ALONZO NEWTON BENN, a citizen of the United States, residing in Chicago, county of Cook, and State of Illinois, have invented a new and useful Process for Treating and Curing Meats and Food Products, which is especially applicable for smoking, drying, and curing pork and beef-hams, pork-shoulders, picnics, loin-rolls, pork backs and bellies, tongues and other meats, game, poultry, and fish food products, of which the following is a specification.

In general terms the object of my invention is to improve the quality, save waste and loss of the meat and lessen the cost of its treatment, as will be more readily understood by the detailed description herein. In a general way I secure these objects by special means of holding and protecting certain parts of the products during the process of treatment.

I prefer to carry out my process by special apparatus which I have invented and for which I have applications for patents under way but my process may be carried out by any suitable means or methods.

My process and its merits will be more easily understood after I explain the preferred form of the apparatus which I use with the process and therefore I will proceed to explain the apparatus first.

Reference will be had to the accompanying drawings in which—

Figure 1 shows a side elevation of one form of my smoke-house trolleys used in carrying out my process. Fig. 2 is an end sectional view on line 2—2 of Fig. 1. Fig. 3 is an enlarged end detail showing the end supports for the smoking cloth. Fig. 4 is a plan of Fig. 3. Fig. 5 is a modified form of some parts of Figs. 3 and 4. Fig. 6 is a plan of the smoking cloth. Fig. 7 is a section on line 7—7 of Fig. 6. Fig. 8 is an elevation of one of the tension adjuster hooks shown in Figs. 1 and 2. Fig. 9 is a plan detail of one of the hang-rails of the trolley. Fig. 10 is a section on line 10—10 of Fig. 9. Fig. 11 is a side elevation and Fig. 12 is a sectional elevation of the shank of meat when spring adjuster hangers are used. Fig. 13 is a side elevation and Fig. 14 an end elevation of a modified form of construction from that shown in Figs. 1 and 2. Fig. 15 is a plan detail of the right end of the smoking cloth supporting frame shown in Figs. 13 and 14. Fig. 16 is a section of transverse detail on line 16—16 of Fig. 15. Fig. 17 is a transverse view on line 17—17 of Fig. 15. Fig. 18 is a sectional end view of a ventilated separator used in connection with the forms shown in Figs. 21 and 22, which has been drawn on a very much larger scale than the other figures and is about full size. Fig. 19 is a plan sectional detail and Fig. 20 a detail on a line 20—20 of Fig. 18 on the same scale as Fig. 18. Fig. 21 is a side elevation with parts broken away of another form of smoke house trolleys from those shown in Figs. 1 and 13 and it is especially useful for flat pieces of meat, fish, etc. Fig. 22 is an end elevation of Fig. 21. Fig. 23 is a plan of one of the shelves shown in Figs. 21 and 22 with parts broken away and a part of the shelf loaded with meat. Fig. 24 is a section on line 24—24 of Fig. 23. Fig. 25 is a section on line 25—25 of Fig. 23. Fig. 26 is a transverse view of spring adjuster heads 47. Fig. 27 shows a detail of the fastening of the wire screen sheeting for the bottom of the shelves shown in Figs. 21 and 22. Fig. 28 is a plan and Fig. 29 a sectional elevation of forked ends that may be used for holding the ends of some forms of meat carried by the apparatus. Fig. 30 is a modified form of my smoke house trolley from that shown in Figs. 1 and 13 and in which the meat is supported with the shank downward. Fig. 31 is a transverse end sectional elevation of Fig. 30. Fig. 32 is a plan sectional detail on line 32—32 of Fig. 30. Fig. 33 is a plan sectional detail on an enlarged scale of the fastening at the right end of Fig. 32. Fig. 34 is a sectional elevation of Fig. 33. Fig. 35 is a plan detail and Fig. 36 an elevation on an enlarged scale of the smoking cloth fastenings used in Figs. 30, 31 and 32. Fig. 37 is an end sectional detail elevation on line 37—37 of Fig. 30. Fig. 38 is a side sectional view of Fig. 37.

Smoke-house trolleys as generally used consist in general design of various forms of frame-work supporting a plurality of pieces of meat in various ways and carried by trolley wheels running on over-head tracks or rails as is common in packing house practice and I also use that general character of a trolley but modified in detail to suit the requirements of my process and to better the service and design of such apparatus.

In the drawing 1 indicates the trolley rail and 2 the trolley wheels and 3 the connecting rod, hook or bolt which connects the trolley frame 4 proper with the trolley wheel carriers 5. The general frame work of the trolley may be of any suitable form or construction and is provided with various vertical, horizontal and cross members as needed to meet the fancy of the designer, but I prefer to use vertical end frame pieces 6, to which I secure the cross frame members of varying designs as needed. I have shown in Fig. 1 the form I prefer to use for general work but any other suitable form of construction may be used. Fixed to the vertical 6 by bolts 7 are the end cross pieces 8 to which are attached the longitudinal hanging rails 9 provided with series of notches 10 which are adapted to engage chain-links and meat-hanging devices. Several rows of the hanging rails 9 are provided in the same trolley. Fixed by detachable pins 11 to the vertical 6 are the end supports 12 for the smoking cloth 13, which is secured to the supports by having its ends lapped over and stitched down in a loop as shown by 14 in Fig. 7 which is threaded over the supports. The supports 12 in Fig. 3 are curved as shown, while the modified form shown in Fig. 5 is simply a straight bar 15.

The meat shown in Figs. 1 and 2 is that of hams 16 and they are supported by fastenings 17 which are secured around the ends of the shanks. Intermediately between each ham the smoking cloth 13 is supported by the adjuster hooks 18 supported by springs 19 hung to adjusting means here shown as chains 20 which are adjustably secured to the hanging rails 9 in notches 10.

When desired I support the meat by means of the spring adjuster hangers secured directly to the shanks in any suitable manner and I have here shown in Figs. 11 and 12 to be used in place of the fastening means spring adjusting devices composed of the chain 21 spring 22 and hanger hook 23. In place of the hanger hooks 23 I ordinarily prefer to use a tie as shown in Figs. 1 and 2.

The chains 20 and 21 are adjusted up and down as desired by locking different links in the notches 10 of the hanging rails 9 as indicated by Figs. 9 and 10.

The meat hung as described and shown in the trolley, Figs. 1 and 2 is thus supported through the medium of the smoking cloth by an elastic tension applied from the bottom and the smoking cloth embraces the meat butt around all of the surface where the fibers are exposed in transverse section, which transverse section exposes different classes of lean, fat and sinuous tissues which vary greatly in shrinkage in the treatment. By adjusting the end supports 12 up or down as desired on the vertical 6 and by the adjustment of the chains 20 which varies the tension of the spring 19 on the hooks 18, any desired portion of the weight of the meat may be supported on the smoking cloth, thus furnishing all of the pressure thereon that may be needed for carrying out my process to advantage.

The arrangement of the smoking cloth as described besides holding and protecting the butts of the meat as described, also prevents dripping from one tier of meat to the tier below, which is a desideratum. The form of trolleys shown in Figs. 13, 14, 15, 16 and 17 varies from that which I have just described chiefly in the method of supporting the smoking cloths under the butts of the meat.

In Fig. 1 a spring adjuster for the smoking cloth is provided between each piece of meat, while in this modified trolley the smoking cloth is supported at the spaces on each side of the butt in a frame supported by spring tension in the trolley. This frame is made of angle-iron members or side rails 24 connected at the ends by cross pieces 25 to which are secured springs 26 supported by adjustable connections in a form of chains 27. Rods 28 are provided on the sides of the angle-iron frame and supported on these in sliding contact are the curved cross rods 29 over which the smoking cloth 13 hangs.

The smoking cloth is looped over at its ends as before described and rods 30 are threaded through the loops which secure the cloth at each end. The rods 30 are held in notches 31 of fastening irons 32 as indicated by Figs. 15 and 16, several notches being provided for variations in adjustment for the length of the cloth.

The smoking cloth will adjust itself over the several rods 29 and under the butts of the meat sufficiently to furnish the required pressure for the protection of the butts in substantially the same manner as is shown by Fig. 1.

In hanging flat pieces of meat, etc., of the forms similar to bacon, side meats, etc., I provide means for supporting and protecting the same without the necessity of hanging it in any way as has been heretofore used. This class of meat is usually cut in shape approximately rectangular and I provide means for inducing it to assume that shape as much as possible for that is the most desirable shape for that class of meat.

My trolleys for flat classes of meat are shown in Figs. 21, 22 and 23 and are provided with adjustable shelves 33 which are hinged at 34 to the vertical 6 of the trolley and are supported in position of angularity desired by the adjustable braces 35 hinged at 36 to the shelves and are adjusted by the means of the notches 37 embracing pins 38 in the verticals 6 and any desired degree of angularity of the shelves may be obtained as is indicated by the dotted line position in Fig. 22.

The bottom of the shelves 33 are made of two layers of wire netting, the bottom one being of coarse fabric 39 and the top one of fine fabric 40, the coarse fabric taking the weight of the load, while the fine fabric gives a more even surface for the meat to rest on.

The smoking cloth is spread over the top of the shelf and the meat is laid thereon with the skin side up and the flesh side in contact with the cloth and in order to support the edges of the pieces of the meat in vertical lines and not interrupt the treatment of these surfaces, I provide specially constructed ventilated separators 41, of which the constructional details are shown in Figs. 18, 19 and 20 and are simply rectangularly faced blocks made of wire of fine mesh 42 supported over a frame-work made of rods 43 held together by end plates 44 and 45. These ventilated separators are about an inch wide horizontally and about two inches high vertically from the bottom of the shelf on which they rest, the intention being to have them about as high as one thickness of meat and to place these separators on the edges of each piece of meat held on the shelves, the purpose being to allow a free circulation of the treating gases and heat on the edges of the meat as well as on the top and bottom.

The smoking cloth used with this class of meat is indicated by 46 and it passes over the flat fleshy side of the meat and up the fleshy edges of it but not over the skin surface and hence it goes between the fleshy side of the meat and the wire screens at all places. Meat of this class before it gets part of the treatment which it receives when in or on the trolleys, yields more or less easily to distortion in shape induced by its supporting means and in order for it to assume the best possible marketable form I provide some spring adjusters adapted to induce the meat to assume an exact rectangular outline. These spring adjusters are in the form of heads 47 secured to flange sockets 48 fixed on to rods 49 pushed downward by springs 50 abutting against the top rail of the shelves 51. The amount of the movement of the springs is limited by the screws 52 screwed into the rods 49 and sliding in slots 53 in sleeves 54; a number of holes 55 are provided in the rods 49 for different locations for the screws 52 thus permitting variations in the adjustment of the springs 50. The heads 47 are made of two pieces, the piece 56 being rigidly secured to the flanged socket 48 while the piece 57 slides longitudinally on 56 and is held in sliding position by guide ways formed by over-turned edges of the piece as is indicated in Fig. 26. This slide adjustment is provided to accommodate different widths or locations of pieces of meat under the head 47.

The meat may be arranged on the shelves in various ways as is indicated by Fig. 23 wherein 58 indicates the pieces which are supported lengthwise across the shelf and 59 the pieces longitudinally disposed.

While I have shown the meat in the drawing located on the shelves with the flesh side down and the skin side up, in some cases it will be more desirable to arrange it the other way but in all cases the smoking cloths will be arranged to protect the flesh side of the meat.

The angular adjustment of the shelves is provided to meet the varying conditions required to carry out the process from time to time to suit the different products treated.

With some classes of meat it is desirable to support the pieces with the butts upward and the shanks downward, which in some cases produces better shapes to the finished product than when otherwise supported. For supporting meat in this manner I provide means in my trolley as is indicated by Figs. 30, 31 and 32.

60 indicates the meat with its butts upward and 61 the smoking cloth arranged over the upper ends of the butts in an approximately reversed arrangement from that shown in Fig. 13. A frame 62 with cross-rods 63 holds the smoking cloth in about the same way as the frame 24. In place of the spring adjusting means for the frame I rely on the weight of the frame and the pressure that I apply in pushing down the frame when it is secured in place by the fasteners after the meat is loaded in. At each end of frame 62 I provide a clip 64 hinged at 65 to lug 66 on the ends of the frame. The clips 64 embrace the vertical 6 of the trolley and pins 67 pass through holes 68 in the vertical 6 and also through holes in the ends of frame 62 whereby the frame is locked down as desired.

In Figs. 30, 31 and 32 I have shown the smoking cloth secured at its ends 69 by being entwined over the end of the frame and in the embrace of a double-ended hook 70; see Fig. 35 and Fig. 36.

To support the shank ends of the meat when in a downward position I provide a skeleton frame or trough composed of the bottom rod 71 and the side rods 72 connected to the bottom rod by the angular rods 73 and on the rods 72 I provide spikes 76 for contact points with the edges of the shanks. The ends of the shank bones are rested upon rod 71 and sustain about all of the weight of the meat.

In some cases it may be desirable instead of supporting the butts vertically arranged as I have shown in Figs. 30, 31 and 32, to support them in an inclined position depending more or less upon the effect produced by the treatment on different products. To facilitate the holding of the pieces in such inclined positions I provide the forked ends indicated by Figs. 28 and 29, which are adapted to have their ends 75 entered into an embrace of the end of the bone of the butt to hold it as desired. The stock end 74 of the forked ends will then be held in a suitable supporting means.

Different food products take on various deformations and changes in character during treatment and curing and it is desirable to be able to control the gravity action on the meat in different directions at different stages of the process and it will be readily understood that this may be accomplished with my invention as above described.

The system of meat supply for the people has almost entirely changed within the short period of time of a single generation, from that of each family or local community handling and curing its own meat, to that of large centralized industries where a single packing plant supplies perhaps the requirements of several States. The centralized systems permit the use of processes, methods and apparatus that are impracticable for individual families or small local communities.

The competition between the larger units of meat and food supply is sufficiently keen and the quantity of production is so large and the price of meat has now arisen to such a high figure that a saving that might have gone unnoticed years ago now becomes almost a controlling factor in the business and any saving in the quantity or quality of the meat products such as that to which my process relates is a valuable factor in the business and in the total general economy of the country at large, so one might say that any saving is a large saving.

In the treatment and curing of meats as heretofore carried on there has always been defective and unusable portions found with nearly every piece of meat brought about by the defects in the holding of the pieces or in the method of treating and curing. Pieces of meat which are held up by strings, hooks and devices having teeth jaws, etc., develop small distortions that injure the final use and sale of some portions of the meat. The way the meat has been supported in the treatment and curing has resulted in developing in the finished product drawn, stretched, shrunken, distorted, burned, cracked, disfigured and damaged portions which injure the appearance and sale of the meat and lessen its food value and in many cases causing severe losses by parts which must be eliminated even before sale. With my process as heretofore described these injuries and losses are reduced to the minimum.

In smoking and curing hams according to the methods heretofore used, the fleshy parts of the meat where the various classes of tissue are exposed shrink and crack unevenly and some of the juices and fats are distilled in varying degree in the different classes of tissue owing to the raw exposure of these surfaces of the meat but on the portions of the meat covered by the skin not so much variation occurs, the skin being a protecting armor for these parts. The skin covered portions require a longer and more severe treatment than do the fleshy exposed portions and the smoking and curing process which is sufficient for the skin covered portions is often too severe for the exposed fleshy portions and thus loss is occasioned owing to this situation.

The only remedy heretofore proposed for the improvement for the smoking and curing of hams that I know of to protect them from the injuries I have above described, has been to inclose the ham in what is called a stockinet, which is a knitted structure of cloth, and is drawn over the entire ham and then the seam or opening is closed over the butt of the ham by having the cloth drawn together and tied in a knot approximately at the centering of the fleshy portion of the ham. Since this stockinet covers the entire ham it affords no protection to balance against the differences between the fleshy and skin portions of the ham and the situation still remains wherein the fleshy portions may be over-treated and yet the skin-covered portions under-treated; further where the knot or closure of the stockinet occurs on the fleshy portion of the butt a wide difference occurs in the treatment of the meat at this point. With my process I can so adjust the protecting means for the fleshy portions of the meat that I can give all parts of it just the desired treatment with the least injury possible and get the best quality results. The hams that have heretofore been treated in stockinets wherein the skin portions have been covered, show that those portions have not always been sufficiently treated to insure the best results.

With my process I can adjust the smoking treatment and curing to save many of the faults that have heretofore appeared in the treatment and in addition to that I can so process the product that I secure improvement in the shape, quality and appearance of the meat never before thought possible. Flat meats may be turned out with my process so they may be sliced for consumption without practically a single scrap of waste outside of the skin itself. Hams and kindred shapes may be processed with my process giving the fullness, symmetry and fine appearance of fresh meats which materially adds to their value.

In smoking meats the direct rays of the heat and smoke burn, crack, shrink and injure various portions of the fleshy parts but with my process the direct rays are deflected and yet the full benefit of the heat and smoke is secured just as efficiently as is possible consistent with the proper process, while with hams which are inclosed in stockinets a large volume of the efficiency of the curing rays and smoke is entirely lost, thereby adding to the cost and time on a relative amount of product as compared with my process.

With stockinet protection a relatively expensive covering must be used as compared with my smoking cloth which may be laundried and used repeatedly.

Meats in being processed as described lose some of their juices and fat which drip downward and where this drip is likely to fall on other meat it is a source of injury. With my process my smoking cloths arrest and prevent this drip most efficiently.

What I claim is:

1. A process of curing or treating meats which consists in holding in a desired position and protecting the fleshy parts of the product while the skin portions thereof remain free and curing or treating the same while so held and protected.

2. A process for curing or treating meat food products which consists in binding the softer portions thereof with a holding and protecting covering, while allowing the tougher and self-sustaining portions to remain free and curing or treating the same while the said parts are so bound, held and protected.

3. A process of treating or curing meats and food products which consists in supporting the same in holding devices adapted to shape and protect the softer and more tender portions while the tougher and self-sustaining portions are exposed and treating or curing the same while so supported and held.

4. A process of treating or curing meats which consists in binding or holding certain portions of the pieces most liable to injury while allowing the self-sustaining portions to be free and curing or treating the same while so bound or held.

5. A process of treating or curing meats which consists in applying a cloth over the softer parts of the meat to cause those portions to receive the treatment in approximately an equal ratio with the skin covered or tougher portions which remain uncovered and curing or treating the same while the cloth is so applied.

6. A process of curing or treating meats which consists in supporting the pieces in suitable apparatus bearing only on certain parts of the meat which are liable to injury in the treatment of the product, to protect the same and secure desired shapes to prevent waste and improve the quality and then treating or curing the product while so supported.

7. A process of treating or curing meats which consists in holding the pieces in positions whereby gravity action during the treatment will cause the deformations induced by the treatment to assume a form desired and treating or curing the meat while so held.

8. In a process of smoking or drying meats which consists in applying pressure to certain parts of the meat to shape and protect those parts from excessive smoking, burning, cracking or drying, while the other parts remain free, and then smoking or drying the product during the application of the pressure.

9. In a process of smoking or drying meats and other food products which consists in applying a spring adjusted contact to certain of the protruding, ill-shaped and infirm parts likely to become damaged, while the other parts remain free, and then smoking or drying the product during the said contact.

10. A process of treating or curing meats which consists in applying cloths to the softer or more easier damaged portions of the meat while allowing the skin protected portions to remain free and treating or curing the same while the said cloths are applied.

11. A process of treating or curing meats or food products which consists in holding the same in an apparatus adapted to protect and shape the softer and weaker parts of the pieces and adjustable in relation to the gravity action on the meat during the treatment and curing or treating the same while in said apparatus and varying the direction of the gravity action as curing or treatment proceeds and demands.

Signed in Chicago, in the State of Illinois and the county of Cook this 1st day of May, 1916.

ALONZO NEWTON BENN.

Witnesses:
AXEL AKERHOLM,
ALBERT J. SAUSER.